April 29, 1969    GABRIELLE JEANNE LLOUQUET    3,441,415
BORN LLOUQUET
FOOD PRODUCTS PRODUCED BY ELECTROPHORESIS OF EMBRYOS AND
PLACENTAL COTYLEDONS
Filed Sept. 17, 1965

INVENTOR.
GABRIELLE JEANNE LLOUQUET,
BORN LLOUQUET,

ATTORNEYS

United States Patent Office 3,441,415
Patented Apr. 29, 1969

3,441,415
FOOD PRODUCTS PRODUCED BY ELECTRO-PHORESIS OF EMBRYOS AND PLACENTAL COTYLEDONS
Gabrielle Jeanne Llouquet, born Llouquet, 43 Rue de Donremy, Paris, France
Filed Sept. 17, 1965, Ser. No. 488,014
Claims priority, application France, Sept. 25, 1964, 989,454
Int. Cl. A23k *1/10;* B01k *5/00*
U.S. Cl. 99—7      14 Claims

ABSTRACT OF THE DISCLOSURE

A food product for addition to animal feed is produced by electrophoresis of embryos of animals belonging to the bovine, ovine, caprine, porcine, or equine families or foetal portions of placenta cotyledons of animals belonging to the bovine family. Said electrophoresis is conducted in a bath of distilled water in which the organs to be treated are immersed. The electrophoresis current is provided by a direct current source the terminals of which are connected to two electrodes, respectively, suspended in said bath. In case of embryos said organs are connected to the negative electrode, whereas in case of foetal portions of placenta cotyledons the organs are connected to the positive electrode. The electrophoresis is maintained until the difference in potential between the organs and the bath becomes substantially zero, whereafter the organs are removed from the bath, dehydrated at a temperature not exceeding about 60° C., and comminuted.

---

Figure 1:
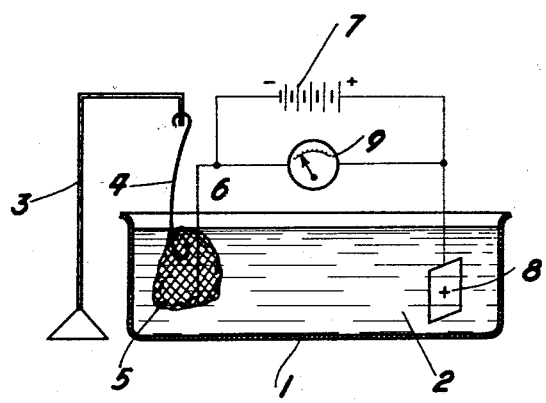

The present invention relates to foods which have the capacity of enabling animals to compensate for environmental conditions incompatible with the normal development of individuals or species.

For a number of years past, with the object of bringing about a rapid development in cattle intended for slaughter without risk of mortality before the animals attain puberty, especially when such animals are reared entirely in the stall, being fed on dry compound foodstuffs, it has been a common practice to incorporate in the animals' feed antbiotics, generally synthetic vitamins, and even medicinal drugs.

These additives have disadvantages to the animals fed in this manner. Their life-span is reduced, which in many cases makes it necessary to slaughter them prematurely, and furthermore their offspring is deficient. What is worse, human beings eating the meat of animals reared in this way may develop pathological conditions, the more dangerous for being not readily detectable.

The present invention relates to a method whereby it is possible to prepare foods intended for adding in small amounts to the foods ordinarily given and capable of ensuring the animals' genetic and biological balance. The compound nutriments thus obtained enable animals for slaughter to be reared in the stall on dry compound foods with the incontestable economic advantages of antibiotics, vitamins and medicinal drugs but without the disadvantages thereof.

The method according to the invention consists in the separate electrophoresis, firstly, in a first bath of distilled water, of embryos of mammalian, for example bovine, ovine, caprine, porcine or equine origin, taken in the first two-thirds of the gestation period, and secondly, in another bath of distilled water, of the foetal portion of cotyledons of bovine placentas taken after the second month of gestation, the said embryos being connetced to the negative pole of a source of direct current, preferably of the order of 220 volts, the positive pole whereof is connected to an electrode immersed in said first bath of distilled water, while the said foetal part of cotyledons is connected to the positive pole of a similar source of direct current, the negative pole whereof is connetced to an electrode immersed in said second bath, and in continuing the said electrophoresis until the difference of potential between the organs treated and the bath of distilled water becomes practically zero, after which the treated organs are taken out of the bath and thereupon dehydrated at a temperature below 60° C., and then reduced to particles, preferably to the state of powder.

Embryos alone, or foetal parts of placentary cotyledons alone, may be treated in the conditions described hereinabove.

By this treatment are preserved in the treated organs only those elements contained in their cells, nuclei and intercellular media which are able to contribute to the formation and to the development of the embryo, in the first place, and then of the individual animal after birth, these nutriments being referred to hereinafter under the name of "Endocytines" (from Greek "endon": inside, and "kustos": cell), and being, biologically speaking, characteristic for the individual. The other elements, some of them inert if not actually noxious, are diffused by the process of electrophoresis in the bath of distilled water. These are the elements which the embryonic organism excretes in the course of being constituted. They are equivalent to hormones, endogenetic vitamins and various external and internal secretions rejected by the individual animal after birth, either in the blood or liver, or to the outside for elimination from the organism, together with the waste products rejected by the alimentary canal, the urine, perspiration, or the epidermis and its derivatives, the phanerogamia (hair, feathers, horns, claws, hoofs, and so forth).

Determination of the poles to be selected for carrying out the electrophoresis is derived from studying the literature relating to differences of electrical potential between different tissues, organs, blood and exterior media in living begins,[1] this work having been completed by research of the same order, as yet unpublished, which has been done on live mammalian ova between maternal blood, maternal placenta, foeta placenta, plasma circulating in the vessels of the umbilical cord, embryonic mass, amniotic fluid, allantoidic fluid, and the different walls and membranes of both uterus and ovum.

Without going into detail about all the work that has been done along these lines, it is sufficient to know that the constituent elements of a vertebrate embryo which, by excluding the non-constituent elements by means of electrophoresis, provide the food material which is the subject of the present invention, are retained in the mass of an embryo which is electrically negative with respect to distilled water in which it is immersed and in the mass of a foetal placenta which is electrically positive under the same conditions, the non-consttiuent elements being diffused in the bath of distilled water which is discarded.

As regards the cotyledons of foetal placentas, those derived from bovines are preferably used for the reason that the latter are the animals in which it is practicable to

---

[1] Cf. J. L. Pech: "La notion d'indice de nutrition": Bulletin de la Société des Sciences médicales et biologiques de Montpellier (VIII, March 18, 1927, pp. 244–246). Jean Turchini: "Des différences de potentiel en histologie," C.R. de l'Assoc. des Anatomistes, 22nd meeting (London, April 11–13, 1927). Jean Turchini: "Mesure de quelques différences de potentiel en biologie et valeur de l'indice de nutrition de J. L. Pech": Bull. de la Soc. des Sc. méd. et biol. de Montpellier (IX, July 29, 1927, pp. 460–462). Jean Turchini and Pierre Feyel: "De queulques différences de potentiel élitrique dans divers groupes zoologiques": Bull. de la Soc. Zoologique de France (T.LIII, No. 7, 1928, pp. 520–523). J. L. Pech: "Alimentation, climatologie et hygiène. Leurs rapports et leur importance dans la vie de l'individu et de l'espèce": Le Mouvement Sanitaire (No. 127, November 1934).

separate the foetal and maternal parts of placentas, whereas in the majority of animals it is not feasible to distinguish these parts from one another unless by examination under a powerful magnifying lens, if not under the microscope, so that separating them by dissection is practically impossible. On the other hand, with bovines, from the second month of gestation, separation of the foetal and maternal parts of placentas can be done as readily as separating a flexible mould from the moulding it contains.

Dehydration of the products resulting from the electrophoresis can be effected in both cases by any known physical procedure, operating however at a temperature below 60° C., and preferably not exceeding 50° C., in order to avoid deterioration of the albumens.

It is however still more advantageous, simpler as well as more economical, to carry out this dehydration by placing the treated organs, after these have been cut into fragments and drained, in ordinary salt for a period of time which may be as long as ten days, after which the organs cleared of salt crystals and drained are dried at about 50° C. in an oven, for example, before being pulverised.

The two endocytine powders thus obtained, which may be used separately or in mixture with one another, in any proportions, as they possess the same alimentary properties, enable animals reared by the integral stalling method on dry compound foods to evolve normally and avoid premature mortality, i.e. at an age preceding the appearance of the outward signs the difference of which will at puberty show the sex of the animal.

The endocytines, therefore, are genetic food materials of embryos and newborn animals. They are sufficient to ensure their development in a normal way up to the end of the first age period when reared wholly in the stall on dry compound foodstuffs. If it is required to continue with the rearing of the animals under the same conditions as far as the age of complete sexual development and reproduction in a biogenetically balanced way, it is indispensable to add to the genetic nutrient constituted by the endocytines of embryos and foetal placentas, from the birth onwards, other complementary nutritional substances which will be referred to hereinafter by the term "Eubiotics" (from Greek "eu": well, and "bios": life). Under this term are to be understood non-toxic animal, vegetable, mineral or organic substances, principally provitamins, which do not constitute medicinal drugs and are used exceptionally as foods although they include oligo elements or provitamins which are indispensable if the genetically balanced animals are to have a field free from attack by certain infectious or parasitic illnesses. By way of example of such eubiotics, use may be made of powders or whole flours of various cereals (barley, oats, rye, buckwheat, etc.), seeds (fieldbeans, lentils, lupine, etc.), tubers (orobus, cyclamen, etc.), dehydrated vegetables (lucern, endive, clover, pimpernel, leaves of beets, turnips, celery, etc.), powdered algae, lichens, mosses, desiccated powdered meat and fish, oligo elements, non-toxic salts, and charcoal and cinchona powder.

The endocytines and the eubiotics have no toxicity and do not need to be administered in carefully measured quantities in the animals' basic food rations.

In the case of the endocytines, 2 to 40 grammes per 100 kilogrammes of ready food are enough to ensure the animals' genetic balance, according to the weight of the individual daily ration. The higher this weight, the smaller the quantity of endocytines to be given.

In the case of the eubiotics, the doses necessary to ensure the biological balance during rearing may vary from 10 grammes to 2 kilogrammes per 100 kilogrammes of food depending on the weight of the individual daily ration. The higher this weight, the lower the quantity of eubiotics. As regards these doses, it may be said in more precise terms, that generally speaking a few milligrammes of endocytines per head per day, and a few centigrammes or even milligrammes of eubiotics per head per day. For example, in the case of poultry consuming on the average 50 g. of feed per head per day, 20 g. of endocytines per 100 kilogrammes of ready food are required. For an animal consuming 1 kg. per day, 2 g. per 100 kg. of ready food will be found sufficient. In this case it is preferable to give the ration of endocytines and eubiotics once a day in a supplement added to the first feed.

The mammalian embryonic and placentary endocytines act equally well on warmblooded vertebrates such as guinea-pigs, rabbits, pigs, cows, sheep, goats, fowls and feathered game as an on coldblooded vertebrates such as fishes, and even insects such as bees.

The eubiotics to be used vary with the species and the foodstuffs forming the basic ration. They can be selected only by rigorously observed rearing tests.

Figure 2:
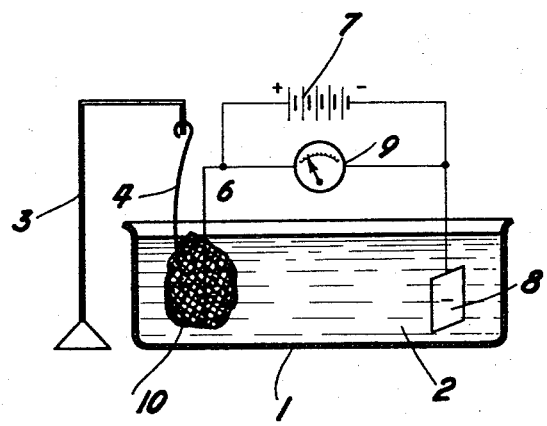

One practical embodiment of the invention in the preparation of embryonic and placentary endocytines is described hereunder, with reference to the accompanying drawings, in which:

FIGURE 1 shows diagrammatically the mounting of an apparatus for the electrophoresis of embryos, and FIGURE 2 is a similar view in the case of the electrophoresis of foetal placentary cotyledons.

As shown in either case, the apparatus comprises a tank 1 made of an insulating material such as glass, for example, having a capacity at least about three times the volume of the organs to be treated, and being filled with distilled water 2. On an insulated support 3 is suspended on a hook 4 a net of plastic material containing the organs to be treated, i.e. one or more embryos 5 (FIGURE 1), or foetal placentary cotyledons 10 (FIGURE 2).

A needle 6 of pure platinum or stainless steel, connected to one of the poles of a source 7 of direct current of 220 volts, is pushed into the mass of the organs to be treated. The other pole of the source 7 is connected to a pure platinum or stainless steel electrode 8 in the form of a plate with a surface of about 6 cm.$^2$. A voltmeter 9 is connected between the electrodes 6 and 8.

In the case of FIGURE 1, for the treatment of embryos, the electrode 6 is connected to the negative pole of the source 7 while the electrode 8 is connected to the positive pole of said source. In the case of FIGURE 2, for the treatment of foetal placentary cotyledons, the electrode 6 is connected to the positive pole of the source 7 and the electrode 8 to its negative pole.

The treatment proceeds as follows:

As soon as the organs 5 or 10 are immersed in the distilled water 2, the electrodes 6 and 8 having first been connected to the source 7, electrophoresis begins.

The voltmeter 9 showing 220 volts evidences that the conductivity of the distilled water 2 is practically nil. Elements extracted from the organs 5 or 10 render the distilled water 2 conductive and the voltage drops to 0. There is no longer any difference of potential between the organs 5 or 10 and the distilled water 2 in which they are immersed. The electrophoresis is then over and the nets holding the organs are removed from the bath of distilled water 2 without delay and without cutting off the current.

The treated organs, cut up into fragments of about 30 cm.$^3$ and then squeezed to express any liquids that may be contained in them, are placed in a glass vessel, separated from one another by coarse sea salt, of which a layer one centimetre thick covers the whole. After 7 or 8 days the organs preserved in this way, by now become as tough as horn, are removed from the brine in which they have lain. They are freed by brushing from the salt crystals which may be on their surface, pressed to get rid of the residues of brine and dried in an oven at 50° C. The dried product is reduced to powder.

The organs may be dried by any other method, provided that the temperature of 50° C. is not exceeded. The powder obtained thus, put up in closed glass jars, will keep for a number of years without requiring special care.

The yield of powdered endocytines is about 20 to 30% of the weight of the organs before their treatment.

Example 1.—Preparing a powder from placento-embryonic endocytines

Embryos were taken and cotyledons of foetal placentas from cows in calf slaughtered between the fourth and fifth month of pregnancy, the animals representing various breeds; the embryos thus taken weighed a total of 47.500 kg. and the cotyledons 14.100 kg.

Said embryos were placed in a nylon net which was suspended as described above in a glass tank having a capacity of about 45 litres into which 33 litres of distilled water were first poured. The stainless steel needle 6 was thrust into the mass of embryos and the electrophoresis treatment was conducted as described hereinabove. The voltage indicated by the voltmeter 9 had dropped to zero at the end of 1 hour 20 minutes.

The net was immediately withdrawn without cutting off the current, the needle 6 was withdrawn from the mass, the treated organs which now weighed no more than 46.900 kg., were taken out of the net, cut up into fragments of about 30 cm.$^3$ and then pressed to extract the liquids. These organs were thereafter dried in the manner described hereinabove by being passed to brine and then through a stove at 50° C., until a degree of moisture had been attained lower than 12–13%, whereupon they were pulverized in a "Forplex" hammer mill.

16.900 kg. of powdered embryonic extracts were obtained.

Parallel with this treatment, the cotyledons of foetal placentas were treated in like manner in identical tanks, the direction of the current, however, as remarked hereinabove, being the reverse of that used in the case of the embryos.

After drying and reduction to powder, 2.700 kg. of placentary powder were obtained and mixed with the embryonic powder that had been obtained as described above.

The endocytine powders obtained in accordance with the invention, when mixed with basic foods so as to give the animals 2 to 20 milligrammes of placento-embryonic endocytines per head per day, depending on the species, permits their rearing and integral reproduction during a number of generations, provided they are completed, in certain cases, by elements rich in oligo-elements and provitamins as defined under the term "eubiotics." It is only by observing rearing tests that it is possible to determine the proportionate amounts and the quality of eubiotics to be given for the particular species and basic food.

Here are some examples of conducting this new style of feeding, with the results obtained.

Example 2.—Industrial enclosed rearing of poultry fed on a dry feed delivered ready for use to the breeder Composition of ready feed used from birth to killing. This food material may be given for a number of years.

Basic foods: Kg.
- Crushed maize _____ 64.890
- Whole oatmeal _____ 2.000
- Whole barley flour _____ 4.000

To this ready food material are added—

Eubiotics:
- Dehydrated lucern flour _____ 4.000
- Dried Peruvian fish _____ 4.000
- Dried meat powder _____ 4.000
- Cooked soya oil-cake _____ 14.000
- Powdered seaweed, lichens, mosses __ 1.000
- Bone phosphates _____ 1.000
- Carbonate of lime _____ 0.400
- Marine salt _____ 0.400
- Oligo-elements (copper, tin, zinc, etc.) _ 0.050
- Magnesium hyposulphite _____ 0.010
- Red cinchona powder _____ 0.150
- Non-resinous charcoal _____ 0.100

Total _____ 100.000

This feed was given to a flock of 200 day-old chicks, complemented by 20 g. of powdered bovine placento-embryonic endocytines obtained as in Example 1, per 100 kg. of basic food.

For a second control flock of 100 day-old chicks the addition of endocytines was replaced by the supplement customarily given in modern industrial poultry breeding.

Antibiotics: G.
- Methionin _____ 62.500
- Furoxane _____ 10.000
- Bacitracin _____ 0.700
- Penicillin _____ 0.300
- Erythromycin _____ 0.250
- Terramycin _____ 0.300
- Choline _____ 75.000

Vitamins:
- A, international units _____ 1,500,000
- $B_1$ _____g__ 0.675
- $B_2$ _____g__ 0.600
- $B_3$ _____g__ 1.500
- $B_{12}$ _____g__ 0.001
- C _____g__ 1.000
- $D_3$, international units _____ 420,000
- E _____g__ 1.200
- K _____g__ 0.250
- PP _____g__ 4.500

Medication:
- Anti-infectious _____ 2
- Anti-parasitic _____ 1

Result of 70-day tests:

No mortality in either flock.

Mean weight of chicks in first flock, given endocytines: 2.110 kg.

Consumption index: 2.59.

Mean weight of chicks in control flock: 1.830 kg.

Consumption index: 2.93.

Character of carcass: chicks given endocytines—normal carcass, high-quality gustatory and culinary qualities. Control flock: abnormal carcass with irreducible oedema, gustatory and culinary qualities much inferior.

Example 3.—Rearing of poultry by a farmer using basic foods selected by him from his own crops The farmer was provided with 25 kg. of supplement for adding to 75 kg. of basic food. Composition of supplement—

Eubiotics: Kg.
- Dried Peruvian fish _____ 3.900
- Dried meat powder _____ 4.000
- Cooked Soya oil-cake _____ 14.000
- Powdered seaweed, lichens and mosses _ 1.000
- Bone phosphates _____ 1.000
- Carbonate of lime _____ 0.400
- Marine salt _____ 0.400
- Oligo-elements (metals) _____ 0.050
- Magnesium hyposulphite _____ 0.010
- Red cinchona powder _____ 0.100
- Placento-embryonic endocytines ____ 0.020

Poultry reared in semi-freedom, with extensive grass run adjoining henhouse. One flock was given the feed made up according to the composition as listed above, while a control flock received the basic feed ordinarily given by the farmer, as stated, without any addition to it.

No mortality. The birds given the benefit of the supplement of endocytines and eubiotics showed a gain in weight of 30% by comparison with the control birds. At 4½ months the cocks weighed 4.750 kg. and were ready for the table. The control birds weighed 2.800 kg. Hens fed with endocytines began laying earlier (by a month) than the control birds, and laid more steadily as well as much more abundantly.

Examples 4 to 9

Examples 2 and 3 were repeated, using, instead of the powdered placento-embryonic extracts obtained in accordance with Example 1:

(a) Only the powdered embryonic extracts according to said Example 1;

(b) Only the powdered placeentary extracts according to said Example 1;

(c) A mixture of equal parts of the powders used in (a) and (b) above.

In all six cases much the same results were obtained.

Example 10.—Rearing of sheep by a family of butchers and graziers

The farm stock of 70 ewes gave birth in four months to 120 lambs, there being many pairs of twins. The ewes were fed by grazing on heathland and with dry hay in the stall. The entirely stall-reared lambs were given a mash of bran and corn in water every morning after the flock was turned out to graze; they sucked freely when the ewes were in stall. To their morning mash were added 2 grammes per head per day of the following supplement.

| Eubiotics: | Kg. |
|---|---|
| Oat husk flour | 80 |
| Rye flour | 19 |
| Placento-embryonic endocytines | 1 |

All the twins were successfully reared; the ewes, which if their milk was insufficient while rearing the lambs had been given the mash given to the lambs with the addition of 2 grammes of supplement, came through well. The lambs were ready for killing at 2½ months and yielded 16 to 18 kg. nett of marketable meat. During all the time that this family has been rearing sheep (more than 50 years), lambs killed at 3½ months have never been known to yield more than 11 to 12 kg. of marketable meat. It was also common for ewes who had to suckle twins to pine and succumb if they were too young or too old. No accident of this kind occurred in the case of the animals fed with the supplement according to the invention. The lambs' meat was of remarkable quality, as were their livers.

Example 11.—Breeding trout in pools at a test station fed with water from the Seine The trout are fed with defatted minced horse meat. Once a fortnight this is replaced by minced horse liver. The ration is calculated for each breeding pool as a function of the total weight of the stock in the pool and of the temperature of the water in accordance with a scale drawn up after lengthy and frequent testing.

From an open air pool containing 200 young rainbow trout born in the station by artificial fecundation and incubation in covered pools the twenty best subjects were taken, having a mean weight of 21 grammes, and then the twenty weakest subjects, presumed not to be viable, with an average weight of 11 grammes. The good subjects were taken as a control sample and reared by the ordinary method of the station. The weak subjects were given 10 grammes per kg. of the combined weight of the twenty subjects of the following supplement added to the minced food and intimately mixed therewith by kneading.

| Eubiotics: | Kg. |
|---|---|
| Cornflour | 9.000 |
| Powdered seaweed and lichens in dried form | 0.900 |
| Endocytines | 0.100 |

During the test which began in the month of February a high mortality rate had decimated all the pools owing to heavy falls of snow and rain disturbing the water. The test batches were in identical pools under shelter. At the end of fourteen weeks all the subjects in the control batch had succumbed, the last survivor of that batch weighing 40 grammes, whereas the mean weight of the batch given the advantage of the supplement was 39.5 grammes. The experiment was stopped in the 17th week. Of the batch of 20 troutlets which had been deemed non-viable at the beginning of the test, 4 survived and their average weight was 50 grammes. They were put back into the original pool in which only 12 subjects (out of 160) remained, weighing on average 47 grammes. The test was therefore conclusive thanks to the eubiotics and endocytines a very much higher survival rate had been obtained for subjects deemed non-viable and a terminal development for the latter fully comparable to that of the control subjects.

While the invention has been described hereinabove with the aid of a particular example and in its application to determined cases, it should be understood that the said invention is in no way limited to this example or to these applications thereof, and that numerous variants and modifications may be made thereto without thereby departing from the scope and conception of the invention.

I claim:

1. The method of preparing a food product for addition to animal feed, to insure the genetic and biological balance of such animals, which includes the steps of providing a bath of distilled water, a source of direct current, and a pair of electrodes connected to the positive and negative terminals of said source, respectively, suspending in said bath and connecting to the negative electrode embryos taken during the first ⅔ of their gestation period of members of the group consisting of the bovine, ovine, caprine, porcine, and equine families, placing the positive electrode in said bath, subjecting said embryos to electrophoresis until the difference in potential between the embryos and the bath becomes substantially zero, removing said embryos from said bath, dehydrating them at a temperature below about 60° C. and comminuting them.

2. A method as claimed in claim 1, wherein the current of said source of continuous current is a voltage of 220 volts.

3. A food supplement for animal feed produced by the method of claim 1.

4. Supplemented animal feed comprising the food product produced by the method of claim 1, and basic food, mixed in the proportions of from about 2 grams to about 40 grams of said food product to about 100 kilograms of basic food.

5. The method of preparing a food product for addition to animal feed, to insure the genetic and biological balance of such animals, which includes the steps of providing a bath of distilled water, a source of direct current and a pair of electrodes, connected to the positive and negative terminals of said source, respectively, suspending in said bath and connecting to the positive electrode the foetal portion of cotyledons of bovine placentaes taken after the first month of gestation, subjecting said cotyledons to electrophoresis until the difference in potential between the said portions of bovine placentaes and the bath becomes substantially zero, removing said portion of bovine placentaes from said bath, dehydrating them at a temperature below about 60° C. and comminuting them.

6. A method as claimed in claim 5, wherein the current of said source of continuous current is a voltage of 220 volts.

7. A food supplement for animal feed produced by the method of claim 5.

8. Supplemented animal feed comprising the food product produced by the method of claim 5 and basic food, mixed in the proportion of from about 2 grams to about 40 grams of the said food product to about 100 kilograms of basic food.

9. A method of preparing foods for animals, comprising the steps of connecting at least one mammalian embryo of an animal reared for slaughter, taken during the first two-thirds of the gestation period of said animal, to the negative terminal of a source of continuous current having a positive terminal and a negative terminal, immersing said embryo in a first bath of distilled water in which is immersed a first electrode connected to the positive terminal of the source of current, whereby a difference of potential is set up between said embryo and said first electrode, connecting at least one foetal part of cotyledons of bovine placenta, taken after the first month of gestation of said bovine, to the positive terminal of a source of continuous current having a positive terminal and a negative terminal, immersing said foetal part of cotyledons in a second bath of distilled water in which is immersed a second electrode connected to the negative terminal of said source of current, whereby a difference of potential is set up between said foetal part and said second electrode, passing said continuous current through said embryo and foetal part of cotyledons in said baths until the differences in potential between said embryo and foetal part of cotyledons and said first and second electrodes, respectively, become practically nil, extracting said embryo and foetal part of cotyledons from the respective baths, dehydrating said embryo and foetal part of cotyledons at a temperature below 60° C., combining and reducing said dehydrated organs to particles.

10. A method as claimed in claim 9, wherein the said mammalian animal reared for slaughter belongs to the class constituted by bovines, ovines, caprines, porcines and equines.

11. A method as claimed in claim 9, wherein the current of said sources of current is a voltage of the order of 200 volts.

12. A method as claimed in claim 9, wherein said particles of dehydrated organs are mixed together.

13. A method as claimed in claim 9, wherein said dehydrated organs are reduced to powder.

14. A food supplement for animal feed produced by the method of claim 9.

References Cited

UNITED STATES PATENTS 2,525,293  10/1950  Gillman _____ 99—7

LIONEL M. SHAPIRO, *Primary Examiner.*

NORMAN ROSKIN, *Assistant Examiner.*

U.S. Cl. X.R.

99—2; 204—180